US010677353B2

(12) United States Patent
Gambetti et al.

(10) Patent No.: US 10,677,353 B2
(45) Date of Patent: Jun. 9, 2020

(54) HYDROSTATIC DRIVE HAVING A CLOSED CIRCUIT AND METHOD FOR OPERATING THE DRIVE

(71) Applicant: THOMAS MAGNETE GMBH, Herdorf (DE)

(72) Inventors: Andrea Gambetti, Rangone (IT); Thassilo Maxeiner, Gemünden (DE)

(73) Assignee: Thomas Magnete GmbH, Herndorf (DE)

( * ) Notice: Subject to any disclaimer, the term of this patent is extended or adjusted under 35 U.S.C. 154(b) by 0 days.

(21) Appl. No.: 16/313,636

(22) PCT Filed: Jun. 16, 2017

(86) PCT No.: PCT/EP2017/000699
§ 371 (c)(1),
(2) Date: Dec. 27, 2018

(87) PCT Pub. No.: WO2018/001546
PCT Pub. Date: Jan. 4, 2018

(65) Prior Publication Data
US 2019/0170246 A1   Jun. 6, 2019

(30) Foreign Application Priority Data

Jun. 28, 2016   (EP) .................................... 16001438

(51) Int. Cl.
*F16H 61/4026* (2010.01)
*F16H 61/4139* (2010.01)
(Continued)

(52) U.S. Cl.
CPC ..... *F16H 61/4026* (2013.01); *F16H 61/4139* (2013.01); *F16H 61/431* (2013.01); *F16H 61/433* (2013.01)

(58) Field of Classification Search
CPC ............. F16H 61/4026; F16H 61/4139; F16H 61/431; F16H 61/433
See application file for complete search history.

(56) References Cited

U.S. PATENT DOCUMENTS

2016/0116060 A1*   4/2016   Schumacher ....... F16H 61/4157
60/327

FOREIGN PATENT DOCUMENTS

DE            4140860 A1    7/1993
DE      102012005824 A1    9/2013
(Continued)

*Primary Examiner* — Michael Leslie
*Assistant Examiner* — Daniel S Collins
(74) *Attorney, Agent, or Firm* — Nath, Goldberg & Meyer; Joshua B. Goldberg

(57) ABSTRACT

A drive, which permits a lowering in the feed pressure provided by the feed pump and, at the same time, effects a supply to the displacement unit of the drive which meets the demand with regard to pressure and delivery volume. This is achieved in that the displacement unit (5) is supplied with hydraulic energy by an electro-hydraulic supply unit (6) wherein the supply unit (6) comprises a hydraulic reservoir (9) and a non-return valve (18) and is connected to the feed pressure limiting valve (12), which is implemented as an electrically adjustable pressure limiting valve, wherein the hydraulic reservoir (9) is also connected to an electro-hydraulic pressure sensor (10), which outputs the electric signal thereof to an electric auxiliary controller (11), and wherein the electric auxiliary controller (11) drives the feed pressure limiting valve (12). These hydraulic drives are used for example, in self-propelled working machines.

20 Claims, 1 Drawing Sheet

(51) Int. Cl.
*F16H 61/431* (2010.01)
*F16H 61/433* (2010.01)

(56) References Cited

FOREIGN PATENT DOCUMENTS

| | | | |
|---|---|---|---|
| DE | 112012005015 | B4 | 9/2017 |
| EP | 1527939 | A1 | 5/2005 |
| EP | 2503195 | A1 | 9/2012 |

\* cited by examiner

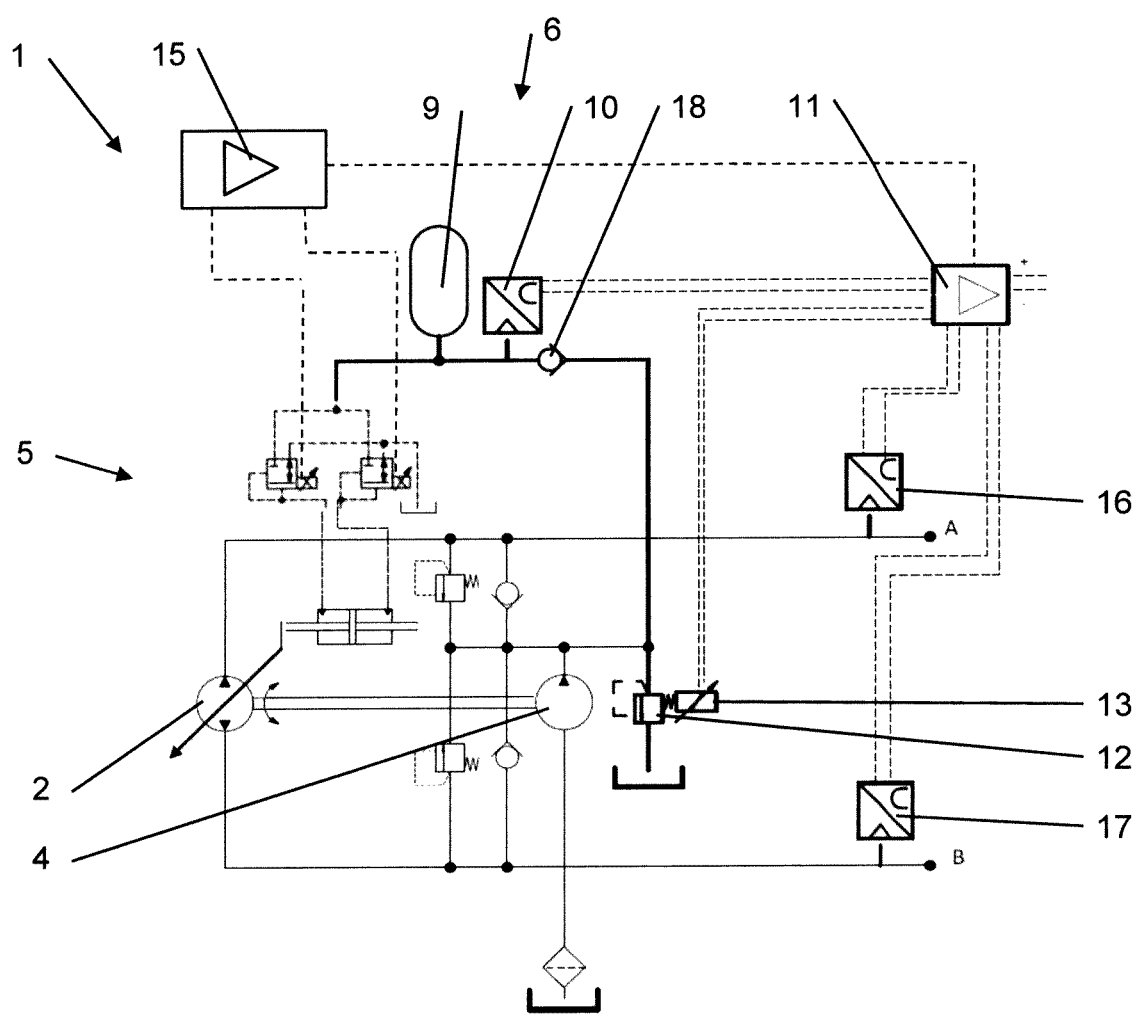

HYDROSTATIC DRIVE HAVING A CLOSED CIRCUIT AND METHOD FOR OPERATING THE DRIVE

This is a National Phase Application filed under 35 U.S.C. 371 as a national stage of PCT/EP2017/000699, filed Jun. 16, 2017, an application claiming the benefit of European Application No. 16001438.7, filed Jun. 28, 2016, the content of each of which is hereby incorporated by reference in its entirety.

The invention relates to a hydrostatic drive having a closed circuit according to the preamble of the first claim. Such drives preferably contain axial-piston pumps with an electro-hydraulically switched or proportionally operating adjustment, but also pumps with hydraulic remote adjustment and pumps with electronic automotive control. In many applications it is not only the pump but also a hydrostatic motor that is adjusted.

State of the Art

Drives with a closed circuit require a liquid feed by means of a feed pump. The supply pressure is then usually set to a fixed pressure, which also simultaneously provides for the withdrawal of actuating energy for pump adjustment; a supply pressure of 20-30 bar is thus usually specified for the pump adjustment. The pump adjustment can be reliably actuated with this supply pressure. But this also requires the supply pressure for the closed circuit to be held constant at this pressure level; the required driving power for the feed pump is defined as the product of the feed rate times the supply pressure, which can however be lower if the control pressure is not inferred from the feed circuit.

A switchable reduction of the supply pressure along with a simultaneous reduction of the supply of control oil as deduced from the supply pressure, which reduces the possible swinging out of the pump against the centering spring, is known from the publication DE 10 2012 005 824A1.

Section 0007 of the document concerning the invention of a supply pressure decrease according to EP 2 503 195 A1 shows the mechanical decoupling of the feed pump of the hydraulic pump, which is not required for the present invention. The proportional pressure regulation of the supply pressure represented in Sections 0009 and 0050 to 0052 serves the purpose of regulating the withdrawal quantity depending on the cooling demand in the closed circuit. In accordance with FIG. 8, this invention provides for a coupling of the supply pressure to the feed pressure without the possibility of storing the actuating energy in a hydraulic accumulator or generating the actuating energy by means of an electrical pump.

The invention according to the publication EP 1 527 939 B2 has a hydraulic accumulator (51) in the control oil circuit, which is loaded by an accumulator loading valve (52), which is fed by the feeding pump circuit and provides actuating energy for notching up of the hydraulically venting brakes at the displacement motors. However the invention does not serve the purpose of lowering the supply pressure while simultaneously maintaining the supply of control oil.

Task

The present invention describes a drive, which enables the decrease of the supply pressure provided by the feed pump, and simultaneously produces a demand-driven supply of the adjustment unit regarding the pressure and the feed rate.

Solution

This task is accomplished by way of the characteristic features of the main claim; further claims implement the invention in greater detail and describe methods for operating the drive.

The reduction of the supply pressure is produced in a known way by means of the adjustable supply pressure limiting valve.

So that the pressure of the supply of the adjustment unit of the drive is not also reduced, the supply unit contains a hydraulic accumulator, which is separated from the feed pump by way of a check valve if the pressure in the hydraulic accumulator is higher than at the feed pump.

For the pressure and the delivery rate to be provided according to the demand, an electrical auxiliary control determines the need of the adjustment unit from electrical signals received from a primary drive control or from the adjustment unit itself.

The pressure of the supply pressure limiting valve is set by the auxiliary drive according to the determined demand, preferably by means of an electrohydraulic actuator.

The hydraulic accumulator is also capable of handling short term, particularly high hydraulic performance requirements of the adjustment unit.

To not only make it possible to control but also to regulate the pressure of the supply unit, the supply unit is advantageously supplemented by an electrohydraulic pressure transducer. This makes measurement of the pressure and demand-driven adjustment of the supply pressure limiting valve possible.

Because the electrical auxiliary control shall also adjust the supply pressure valve, it is of advantage for this auxiliary control to obtain information about the pressure in the operating lines of the drive, so that it can determine the stress on the drive and therewith the supply pressure demand of the drive based on the aforesaid pressures. The supply pressure demand can also be described as dependent on the speed of the hydrostatic motor. In this event, the signals from the drive control allow for an estimation and consideration of the speed.

The supply pressure also affects the heat balance of the drive so it is therefore of advantage to measure the temperature in the drive at appropriate locations, to send the results of the measurements to the electrical auxiliary control and to determine the minimum supply pressure depending on the measured temperature.

If the supply pressure demand and the power demand of the supply unit are low, the supply pressure is adjusted by the auxiliary control to a lower value and the power consumption of the feed pump is thus reduced, which particularly improves the efficiency of the hydrostatic drive unit in a partial load operation.

APPLICATION

Hydrostatic drives of the kind described are for example used in self-propelled machines.

Images: FIG. 1 shows the circuit diagram of the hydrostatic drive unit of this invention.

EXEMPLARY IMPLEMENTATION

A hydrostatic drive (1) according to FIG. 1, consists of at least one variable flow pump (2), one or more hydraulic motors (not shown), a feed pump (4), a supply pressure limiting valve (12), an adjustment unit (5) and the drive control (15) driving the adjustment unit.

The adjustment unit (5) is supplied with hydraulic energy by an electrohydraulic supply unit (6), wherein the supply unit (6) consists of a hydraulic accumulator (9) and a check valve (18) and is connected to the supply pressure limiting valve (12), which is configured as an electrically adjustable pressure limiting valve.

The hydraulic accumulator (9) is also connected to an electrohydraulic pressure sensor (10), which transmits its electrical signal to an electrical auxiliary control (11), wherein the electrical auxiliary control (11) controls the supply pressure limiting valve (12).

The supply pressure limiting valve (12) is preferably adjusted by an electromagnetic actuator (13), wherein the electromagnetic actuator is electrically connected to the auxiliary control (11).

The supply pressure limiting valve (12) is furthermore preferably configured as a proportionally operating electrohydraulic valve, wherein the auxiliary control (11) sends a proportional electrical signal to the electrical actuator (13).

The supply pressure limiting valve (12) furthermore preferably receives a proportional electrical current from the electrical auxiliary control (11) as an input signal, wherein the electrical actuator is configured so that the set value of the supply pressure is decreased with increasing electric current and the set value of the supply pressure is increased with decreasing electric current.

The outlets for the operating pressures of the variable flow pump (2) are advantageously connected to operating pressure sensors (16, 17), wherein the signals from the operating pressure sensors are sent to the auxiliary control (11) or the drive control (15).

The supply unit (6) is furthermore advantageously also connected to additional electrohydraulic or hydromechanical devices so as to supply them with hydraulic energy. These devices are preferably electrohydraulic valves which pre-steer other valves or couplings or cylinders.

In a further development of this invention, temperature sensors whose signals are sent to the auxiliary control are installed at appropriate locations of the hydrostatic drive. Appropriate location can be the operating lines, the pump housing or the line leading from the supply pressure limiting valve to the tank.

For purposes of operating the hydrostatic drive, the electrical auxiliary control (11) is configured as a program-controlled control system and it controls the supply pressure limiting valve (12) so that the supply unit (6) supplies hydraulic energy to the adjustment unit (5) as demanded, with the demand being determined from electrical signals received from the adjustment unit (5), from a drive control (15) overriding the auxiliary control (11) or from signals received from the working pressure sensors (16, 17).

The auxiliary control then preferably controls the supply pressure limiting valve (12) electrically so that the supply pressure and therewith also the pressure of the supply unit (6) is increased or decreased in consideration of the supply pressure demand of the variable flow pump in case of a fluctuating power requirement of the adjustment unit (5), wherein the power requirement of the adjustment unit is determined from signals from the adjustment unit and from the signal from the pressure sensor (10) in the auxiliary control (11) and wherein the supply pressure demand of the variable flow pump (2) is determined from signals received from the operating pressure sensors (16, 17).

If there is no increased power requirement by the adjustment unit, the supply pressure is lowered as much as possible while taking the operating situation of the hydrostatic drive as determined from the signals from the working pressure sensors and from other available signals into account. This decrease of the supply pressure leads to a considerable reduction of the power dissipation.

LIST OF THE REFERENCE SYMBOLS

1. Hydrostatic drive unit
2. Variable flow pump
4. Feed pump
5. Adjustment unit
6. Supply unit
9. Hydraulic accumulator
10. Pressure sensor
11. Electrical auxiliary control
12. Supply pressure limiting valve
13. Actuator
15. Drive control
16. Operating pressure sensor
17. Operating pressure sensor
18. Check valve

The invention claimed is:

1. Hydrostatic drive unit, comprising
a variable flow pump,
a hydraulic motor,
a feed pump,
a supply pressure limiting valve,
an adjustment unit, and
a drive control controlling the adjustment unit,
wherein the adjustment unit is supplied with hydraulic energy by an electrohydraulic supply unit,
wherein the supply unit comprises at least one hydraulic accumulator and a check valve and is connected to the supply pressure limiting valve, which is configured as an electrically adjustable pressure limiting valve,
wherein the hydraulic accumulator also is connected to an electrohydraulic pressure sensor, which delivers its electrical signal to an electrical auxiliary control, and
wherein the electrical auxiliary control controls the supply pressure limiting valve.

2. Hydrostatic drive unit according to claim 1, wherein the supply pressure limiting valve is adjusted by an electromagnetic actuator, wherein the electromagnetic actuator is electrically connected to the auxiliary control.

3. Hydrostatic drive unit according to claim 1, wherein the supply pressure limiting valve is configured as a proportionally-operating electrohydraulic valve, wherein the auxiliary control sends a proportional electrical signal to the electrical actuator.

4. Hydrostatic drive unit according to claim 1, wherein the electrohydraulic supply pressure limiting valve receives a proportional current as an input signal from the electrical auxiliary control, wherein the electrical actuator is configured so that the set value of the supply pressure is decreased with increasing electric current and the set value of the supply pressure is increased with decreasing electric current.

5. Hydrostatic drive unit according to claim 1, wherein outlets for the operating pressures of the variable flow pump are connected to operating pressure sensors, wherein the signals from the operating pressure sensors are sent to at least one of the auxiliary control and the drive control.

6. Hydrostatic drive unit according to claim 1, wherein the supply unit is also connected to at least one of additional electrohydraulic and mechanical devices to supply them with hydraulic energy.

7. Hydrostatic drive unit according to claim 1, wherein the outlet of the auxiliary pump is connected to electrohydraulic valves which precontrol other valves.

8. Hydrostatic drive unit according to claim 1, wherein an outlet of the auxiliary pump is connected to electrohydraulic valves which control at least one of couplings and cylinders.

9. Hydrostatic drive unit according to claim 1, wherein the electrical auxiliary control is configured as a program-controlled control system and controls the supply pressure limiting valve so that the supply unit supplies the adjustment unit with hydraulic energy as needed, wherein the demand is determined based on electrical signals from at least one of the adjustment unit, a drive control overriding the auxiliary control and signals from operating pressure sensors connected to outlets of the variable flow pump.

10. Hydrostatic drive unit according to claim 1, wherein the auxiliary control controls the supply pressure limiting valve electrically so that the supply pressure and therewith also the pressure of the supply unit is increased or decreased in consideration of the supply pressure demand of the variable flow pump in case of a fluctuating power requirement of the adjustment unit, wherein the power requirement of the adjustment unit is determined from the signal from the pressure sensor in the auxiliary control and wherein the power requirement of the variable flow pump is determined from signals received from operating pressure sensors.

11. Hydrostatic drive unit, comprising
a variable flow pump,
a hydraulic motor,
a feed pump,
a supply pressure limiting valve,
an adjustment unit, and
a drive control controlling the adjustment unit,
wherein the adjustment unit is supplied with hydraulic energy by an electrohydraulic supply unit,
wherein the supply unit comprises at least one hydraulic accumulator and a check valve and is connected to the supply pressure limiting valve, which is configured as an electrically adjustable pressure limiting valve,
wherein the hydraulic accumulator also is connected to an electrohydraulic pressure sensor, which delivers its electrical signal to an electrical auxiliary control,
wherein the electrical auxiliary control controls the supply pressure limiting valve,
wherein the electrical auxiliary control is configured as a program-controlled control system and controls the supply pressure limiting valve so that the supply unit supplies the adjustment unit with hydraulic energy as needed, and
wherein the demand is determined based on electrical signals from at least one of the adjustment unit, a drive control overriding the auxiliary control and signals from operating pressure sensors connected to outlets of the variable flow pump.

12. Hydrostatic drive unit, comprising
a variable flow pump,
a hydraulic motor,
a feed pump,
a supply pressure limiting valve,
an adjustment unit, and
a drive control controlling the adjustment unit,
wherein the adjustment unit is supplied with hydraulic energy by an electrohydraulic supply unit,
wherein the supply unit comprises at least one hydraulic accumulator and a check valve and is connected to the supply pressure limiting valve, which is configured as an electrically adjustable pressure limiting valve,
wherein the hydraulic accumulator also is connected to an electrohydraulic pressure sensor, which delivers its electrical signal to an electrical auxiliary control,
wherein the auxiliary control controls the supply pressure limiting valve electrically so that the supply pressure and therewith also the pressure of the supply unit is increased or decreased in consideration of the supply pressure demand of the variable flow pump in case of a fluctuating power requirement of the adjustment unit,
wherein the power requirement of the adjustment unit is determined from the signal from the pressure sensor in the auxiliary control, and
wherein the power requirement of the variable flow pump is determined from signals received from operating pressure sensors.

13. Hydrostatic drive unit according to claim 11, wherein the supply pressure limiting valve is adjusted by an electromagnetic actuator, wherein the electromagnetic actuator is electrically connected to the auxiliary control.

14. Hydrostatic drive unit according to claim 12, wherein the supply pressure limiting valve is configured as a proportionally-operating electrohydraulic valve, wherein the auxiliary control sends a proportional electrical signal to the electrical actuator.

15. Hydrostatic drive unit according to claim 11, wherein the electrohydraulic supply pressure limiting valve receives a proportional current as an input signal from the electrical auxiliary control, wherein the electrical actuator is configured so that the set value of the supply pressure is decreased with increasing electric current and the set value of the supply pressure is increased with decreasing electric current.

16. Hydrostatic drive unit according to claim 11, wherein outlets for the operating pressures of the variable flow pump are connected to operating pressure sensors, wherein the signals from the operating pressure sensors are sent to at least one of the auxiliary control and the drive control.

17. Hydrostatic drive unit according to claim 12, wherein the supply unit is also connected to at least one of additional electrohydraulic and mechanical devices to supply them with hydraulic energy.

18. Hydrostatic drive unit according to claim 12, wherein the outlet of the auxiliary pump is connected to electrohydraulic valves which precontrol other valves.

19. Hydrostatic drive unit according to claim 11, wherein an outlet of the auxiliary pump is connected to electrohydraulic valves which control at least one of couplings and cylinders.

20. Hydrostatic drive unit according to claim 11, wherein the auxiliary control controls the supply pressure limiting valve electrically so that the supply pressure and therewith also the pressure of the supply unit is increased or decreased in consideration of the supply pressure demand of the variable flow pump in case of a fluctuating power requirement of the adjustment unit, wherein the power requirement of the adjustment unit is determined from the signal from the pressure sensor in the auxiliary control and wherein the power requirement of the variable flow pump is determined from signals received from operating pressure sensors.

* * * * *